(12) United States Patent
Liu et al.

(10) Patent No.: US 9,657,154 B2
(45) Date of Patent: May 23, 2017

(54) RESIN COMPOSITION AND USES OF THE SAME

(71) Applicant: TAIWAN UNION TECHNOLOGY CORPORATION, Chupei, Hsinchu County (TW)

(72) Inventors: Shur-Fen Liu, Chupei (TW); Meng-Huei Chen, Chupei (TW); Hsin-Ho Wu, Chupei (TW)

(73) Assignee: TAIWAN UNION TECHNOLOGY CORPORATION, Chupei, Hsinchu County (TW)

( * ) Notice: Subject to any disclaimer, the term of this patent is extended or adjusted under 35 U.S.C. 154(b) by 161 days.

(21) Appl. No.: 14/582,233

(22) Filed: Dec. 24, 2014

(65) Prior Publication Data

US 2015/0183952 A1 Jul. 2, 2015

Related U.S. Application Data

(60) Provisional application No. 61/921,113, filed on Dec. 27, 2013.

(30) Foreign Application Priority Data

Dec. 18, 2014 (TW) .............................. 103144283 A

(51) Int. Cl.

| | |
|---|---|
| *C08K 3/22* | (2006.01) |
| *C08L 63/00* | (2006.01) |
| *C08L 37/00* | (2006.01) |
| *C08L 71/02* | (2006.01) |
| *C08K 5/02* | (2006.01) |
| *C08J 5/24* | (2006.01) |
| *B32B 15/08* | (2006.01) |
| *B32B 27/20* | (2006.01) |
| *C08J 5/10* | (2006.01) |
| *C09D 163/00* | (2006.01) |
| *C08G 59/68* | (2006.01) |

(52) U.S. Cl.
CPC ............... *C08K 3/22* (2013.01); *B32B 15/08* (2013.01); *B32B 27/20* (2013.01); *C08G 59/686* (2013.01); *C08J 5/10* (2013.01); *C08J 5/24* (2013.01); *C08K 5/02* (2013.01); *C08L 37/00* (2013.01); *C08L 63/00* (2013.01); *C08L 71/02* (2013.01); *C09D 163/00* (2013.01); *B32B 2260/021* (2013.01); *B32B 2260/046* (2013.01); *B32B 2264/107* (2013.01); *B32B 2305/076* (2013.01); *B32B 2457/08* (2013.01); *C08J 2335/06* (2013.01); *C08J 2337/00* (2013.01); *C08J 2363/00* (2013.01); *C08J 2371/02* (2013.01); *C08J 2371/12* (2013.01); *C08J 2435/06* (2013.01); *C08J 2437/00* (2013.01); *C08J 2463/00* (2013.01); *C08J 2471/02* (2013.01); *C08K 2003/2206* (2013.01); *C08K 2003/2237* (2013.01); *Y10T 428/31678* (2015.04)

(58) Field of Classification Search
CPC ... C08K 3/22; C08L 71/02; C08J 5/24; B32B 15/08
USPC ............... 428/457; 427/385.5; 523/439, 458; 524/413
See application file for complete search history.

(56) References Cited

U.S. PATENT DOCUMENTS

| | | | |
|---|---|---|---|
| 6,495,244 B1 * | 12/2002 | Andresakis | B32B 15/08 174/258 |
| 7,700,185 B2 | 4/2010 | Kumashiro et al. | |
| 2004/0147658 A1 | 7/2004 | Matsushima et al. | |
| 2004/0164282 A1 | 8/2004 | Okamoto et al. | |
| 2007/0179217 A1 * | 8/2007 | Hwang | C08L 63/00 523/458 |
| 2011/0048776 A1 * | 3/2011 | Qiang | B32B 15/20 174/258 |
| 2012/0315814 A1 * | 12/2012 | Fung | C08L 9/00 442/117 |
| 2014/0151094 A1 | 6/2014 | Takeuchi et al. | |
| 2015/0313012 A1 | 10/2015 | Chen et al. | |

FOREIGN PATENT DOCUMENTS

| | | |
|---|---|---|
| CN | 102993683 A | 3/2013 |
| TW | 200605097 | 2/2006 |
| TW | 201302845 A1 | 1/2013 |

OTHER PUBLICATIONS

Lee, et al: "Microstructure and permittivity of sintered BaTiO3: influence of particle surface chemistry in an aqueous medium"; Materials Research Bulletin 39 (2004) 99-102.
TW Office Action dated Aug. 26, 2015 in corresponding Taiwan application (No. 103144283).
Office Action issued in corresponding China patent application No. 201410802301.6 on Jun. 24, 2016.

* cited by examiner

*Primary Examiner* — Doris Lee
(74) *Attorney, Agent, or Firm* — McClure, Qualey & Rodack, LLP

(57) ABSTRACT

A resin composition is provided. The resin composition includes a thermosetting resin component and a filler, wherein the thermosetting resin component has a dissipation factor (Df) of no more than 0.006 at 1 GHz, the filler is a ceramic powder obtained through a sintering process at a temperature ranging from 1300° C. to less than 1400° C., and the amount of the filler is 10 parts by weight to 600 parts by weight per 100 parts by weight of the thermosetting resin component.

12 Claims, No Drawings

RESIN COMPOSITION AND USES OF THE SAME

CLAIM FOR PRIORITY

This application claims the benefit of U.S. Provisional Patent Application No. 61/921,113, filed on Dec. 27, 2013. This application also claims priority to Taiwan patent application No. 103144283, filed Dec. 18, 2014.

CROSS-REFERENCES TO RELATED APPLICATIONS

Not applicable.

BACKGROUND OF THE INVENTION

Field of the Invention

The present invention provides a resin composition and a prepreg and laminate prepared using the same. Specifically, the present invention provides a resin composition useful for preparing a laminate with a high peeling strength, a high dielectric constant (Dk) and low dielectric loss.

Descriptions of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Conventional resins include epoxy resins, phenolic resins, polyamine formaldehyde resins, silicone resins or polytetrafluoroethylene resins. Conventional reinforcing materials include glass fiber cloths, glass fiber mats, insulating papers or linen cloths.

In general, a print circuit board can be prepared by using the following method: immersing a reinforcing material, such as glass fiber fabric into a resin (e.g. epoxy resin), and curing the immersed glass fiber fabric into a semi-cured state to obtain a prepreg; superimposing certain layers of the prepregs and superimposing a metal foil on at least one external surface of the superimposed prepregs to provide a superimposed object; hot-pressing the superimposed object to obtain a metal clad laminate; etching the metal foil on the surface of the metal clad laminate to form a defined circuit pattern; and finally, drilling a plurality of holes on the metal clad laminate and plating these holes with a conductive material to form via holes to accomplish the preparation of the printed circuit board.

As the sizes of electronic devices have become smaller, PCBs must be thinned and made more densely to include more active and passive components. In view of this, component-functional areas must be formed within a laminate to allow for more freedom in the circuit design. A radio frequency (RF) field especially requires highly dense PCBs. This is because the use of a laminate with excellent electrical properties (high dielectric constant and low dielectric loss) to incorporate a passive component into the laminate will allow general radio frequency modules and digital systems to be incorporated into one single PCB. Unfortunately, the dielectric loss of a laminate prepared by epoxy resin is still high (the Df is high), and the dielectric constant (Dk) of the laminate also fails to meet the requirements of a capacitor material. As a result, the industry has been trying to develop a dielectric material which is low-cost, but has excellent electrical properties (high Dk and low Df).

US 2004147658 discloses a composition for the formation of a built-in capacitor layer of a printed wiring board, which includes a dielectric powder with a particle size ranging from 0.1 μm to 2 μm, such as barium titanate ($BaTiO_3$) or strontium titanate ($SrTiO_3$). The composition is still prepared based on an epoxy resin system. The dielectric loss (Df) is therefore still high.

U.S. Pat. No. 7,700,185 discloses an insulation composite material, which is composed of a filler with a high dielectric constant and an insulation resin (mostly epoxy resin). The filler must be a ceramic powder with a bimodal particle size distribution; and a dispersant must be used to help disperse the powder. As can be seen from the illustrated examples, though the insulation composite material has a high Dk, its Df is still high (up to 0.02).

In view of this, the present invention provides a resin composition, which is useful in preparing a laminate with satisfactory physicochemical properties, especially a high peeling strength (>5 pound/inch), high Dk, and low Df.

SUMMARY OF THE INVENTION

One objective of the present invention is to provide a resin composition comprising a thermosetting resin component and a filler, wherein the thermosetting resin component has a dissipation factor (Df) of no more than 0.006 at 1 GHz, the filler is a ceramic powder obtained through a sintering process at a temperature ranging from 1300° C. to less than 1400° C., and the amount of the filler is 10 parts by weight to 600 parts by weight per 100 parts by weight of the thermosetting resin component.

Another objective of the present invention is to provide a prepreg, which is prepared by immersing a substrate into the resin composition that is described above, and drying the immersed substrate.

Another objective of the present invention is to provide a laminate, comprising a synthetic layer and a metal layer, wherein the synthetic layer is made from the prepreg as mentioned above.

To render the above objectives, technical features and advantages of the present invention more apparent, the present invention will be described in detail with reference to some embodiments hereinafter.

DESCRIPTION OF THE PREFERRED EMBODIMENT

Hereinafter, some embodiments in accordance with the present invention will be described in detail. However, without departing from the spirit of the present invention, the present invention may be applied to various embodiments. The scope of the present invention shall not be considered to be limited to what is illustrated herein. Furthermore, unless it is additionally explained, the expressions "a", "the", or the like recited in the specification of the present invention (especially in the claims) should include both the singular and plural forms. Unless it is additionally explained, when describing the components in the solution, mixture, and composition in the specification, the amount of each constituent is counted based on the solid content, i.e., disregarding the weight of the solvent.

The present invention provides a resin composition for the preparation of laminate comprising a thermosetting resin component and a filler. The laminate prepared using the resin composition is not only provided with an outstanding peeling strength but also a high dielectric constant (high Dk) and low dielectric loss (low Df). Its high dielectric constant property could provide a better polarizing effect and its low dissipation factor property at high frequency is especially suitable for a high frequency print circuit board field (e.g., the radio frequency field) for forming a passive component such as a capacitor component.

Specifically, the present invention provides a resin composition comprising a thermosetting resin component and a filler, wherein the thermosetting resin component has a dissipation factor (Df) of no more than 0.006 at 1 GHz, and the filler is a ceramic powder obtained through a sintering process at a temperature ranging from 1300° C. to less than 1400° C. The ratio between the amount of the filler and the thermosetting resin component is not particularly limited and may be adjusted depending on the needs of the user. In general, the amount of the filler is 10 parts by weight to 600 parts by weight per 100 parts by weight of the thermosetting resin component, and preferably, 50 parts by weight to 400 parts by weight per 100 parts by weight of the thermosetting resin component.

One of the characteristics of the present invention is that the filler is a ceramic powder obtained through a sintering process at a temperature ranging from 1300° C. to less than 1400° C. and preferably from 1350° C. to less than 1400° C. Except for the specified sintering temperature condition, the method of manufacturing the ceramic powder is not particularly limited and is basically identical to the method of preparing general ceramic material. Since the method of preparing the general ceramic material is well-known for persons with ordinary skill in the art, it will not be further discussed herein but only described in the illustrated examples. Under the specified sintering temperature condition, the resin composition of the present invention could provide a laminate with satisfactory physicochemical properties, especially a high peeling strength (>5 pound/inch), high Dk, and low Df. If the sintering temperature is lower than the specified range, i.e. lower than 1300° C., it will not be able to obtain a laminate with a low Df value. On the other hand, if the sintering temperature is higher than the specified range, i.e. equal to or higher than 1400° C., the sintered ceramic material will become an agglomerate and difficult to be milled into powder. The surface of the obtained powder will then be too smooth to be compatible with other components of the resin composition. Moreover, the prepared laminate has the shortcomings of poor peeling strength, low Dk, and poor appearance. The ceramic powder may be that with a perovskite or sudo-perovskite lattice structure. Examples of the ceramic powder include, but is not limited to, titanium dioxide ($TiO_2$), strontium titanate ($SrTiO_3$), calcium titanate ($CaTiO_3$), barium titanate ($BaTiO_3$), magnesium titanate ($MgTiO_3$), a sintered material of two or more of the foregoing compounds, and combinations thereof. Examples of the sintered material include calcium strontium titanate ($Sr(Ca)TiO_3$), barium strontium titanate ($Sr(Ba)TiO_3$), etc. In addition, as known by persons with ordinary skill in the art, the NPO ceramic powder is a ceramic powder that is doped with Si, Co, Ni, Mn, and/or rare earth elements. In the illustrated examples of the specification, the filler of the resin composition is strontium titanate ($SrTiO_3$), barium strontium titanate ($Sr(Ba)TiO_3$), calcium strontium titanate ($Sr(Ca)TiO_3$), NPO ceramic powders, or a combination thereof, and is sintered at 1350° C. or 1300° C.

In addition, without being restricted by any theories, it is believed that a filler with a very small particle size (for example a particle size lower than 0.1 μm) will not be able to provide a significant improvement in the Dk. Therefore, the average particle size of the filler of the resin composition is preferably 0.1 μm to 10 μm and more preferably 2 μm to 6 μm. Additionally, to obtain a product with a uniform electrical property, the average particle size of the filler is preferably in a unimodal distribution.

It is well-known that "thermosetting resin" refers to a polymer that can be gradually cured by forming a network structure through a heat treatment. In the resin composition of the present invention, the thermosetting resin component may be a single thermosetting resin or a mixture of multiple thermosetting resins. Regardless of using a single thermosetting resin or a mixture of multiple thermosetting resins, the Df value of the finally obtained thermosetting resin component must not be higher than 0.006 at 1 GHz.

Specifically, the thermosetting resin component of the resin composition of the present invention may be provided by a thermosetting resin selected from the group consisting of polyphenylene ether resins with one or more reactive functional groups, styrene-based copolymers and oligomers with one or more reactive functional groups, and butadiene-based copolymers and oligomers with one or more reactive functional groups, and combinations thereof. Alternatively, the thermosetting resin component may be provided by combining at least one of the above thermosetting resins with other known thermosetting resins, such as epoxy resin; however, in this case, the Df value of the thermosetting resin component cannot be higher than 0.006 at 1 GHz. Examples of polyphenylene ether resins with one or more reactive functional groups include but are not limited to polyphenylene ether resins with acrylic groups, polyphenylene ether resins with alkenyl groups, and polyphenylene ether resins with hydroxy groups. Examples of styrene-based copolymers and oligomers with one or more reactive functional groups comprise but are not limited to the copolymer of styrene maleic anhydride (SMA). Examples of the butadiene-based copolymers and oligomers with one or more reactive functional groups include but are not limited to polybutadiene, butadiene and styrene copolymer, etc. Examples of the epoxy resin include but are not limited to bisphenol A-type phenolic epoxy resin, bisphenol F-type phenolic epoxy resin, brominated epoxy resin, cycloaliphatic epoxy resin, naphthalene-containing epoxy resin, and bisphenylidene epoxy resin. Furthermore, the "reactive functional group" in the context may be any group capable of conducting a curing reaction. For example, the reactive functional group may be a hydroxyl group, carboxyl group, alkenyl group, amino group, acid anhydride group, or maleic anhydride group, but is not limited thereto.

The resin composition of the present invention may optionally comprise other additives, such as a hardening promoter, a dispersing agent, a flexibilizer, a flame retardant, a release agent, etc. Those additives may be taken alone or in combination. For example, a phosphorous-containing flame retardant or a bromine-containing flame retardant (such as 1,2-bis(pentabromophenyl) ethane), but is not limited thereto, may be added to enhance the flame retardance of the product. Alternately, a hardening promoter selected from the group consisting of the following components may also be added to provide an improved hardening effect: benzoyl peroxide (BPO), imidazole (MI), 2-methylimidazole (2MI) and 2-ethyl-4-methylimidazole (2E4MI), 2-phenylimidazole (2PI). The amount of those additives may be adjusted depending on the needs of persons with ordinary skills in the art based on the disclosure of the specification, and is not particularly limited.

The resin composition of the present invention may be prepared into varnish by evenly mixing the thermosetting resin component and the filler through a stirrer and dissolving or dispersing the mixture into a solvent for subsequent applications. The solvent may be any inert solvent which can dissolve or disperse but not react with the components of the resin composition of the present invention. For example, the solvent that can dissolve or disperse the resin composition of the present invention includes, but is not limited to, methyl ethyl ketone (MEK), γ-butyrolactone, toluene, cyclohexanone, propanone, xylene, methyl isobutyl ketone, N,N-dimethyl formamide (DMF), N,N-dimethyl acetamide (DMAc), N-methyl-pyrolidone (NMP), and mixtures thereof. The amount of the solvent is not particularly limited as long as the components of the resin composition can be mixed evenly. In the appended examples, a mixture of methyl ethyl ketone and γ-butyrolactone is used as the solvent.

The present invention further provides a prepreg which is obtained by immersing a substrate (reinforcing materials) into the resin composition mentioned above, and drying the immersed substrate. A conventional reinforcing material includes a glass fiber cloth (a glass fabric, a glass paper, a glass mat, etc.), a kraft paper, a short fiber cotton paper, a nature fiber cloth, an organic fiber cloth, etc. In some embodiments of the present invention, a 2116 reinforced glass fiber cloth is illustrated as the reinforcing material, which is then coated with the resin composition and thereafter heated and dried at 175° C. for 2 to 15 minutes to provide a semi-cured prepreg.

The abovementioned prepreg can be used for manufacturing a laminate. Thus, the present invention further provides a laminate comprising a synthetic layer and a metal layer, wherein the synthetic layer is made from the above prepreg. The laminate may be prepared by the following process: superimposing a plurality of prepregs and superimposing a metal foil (such as a copper foil) on at least one external surface of the superimposed prepregs to provide a superimposed object; and performing a hot-pressing operation onto the superimposed object to obtain the laminate. Moreover, a printed circuit board can be obtained by patterning the metal foil of the laminate.

The present invention will be further illustrated by the embodiments hereinafter, wherein the measuring instruments and methods are respectively as follows:

[Solder Resistance Test]

The solder resistance test is carried out by immersing the dried laminate in a solder bath at 288° C. for a while and observing whether there is any defect such as delamination and expansion.

[Peeling Strength Test]

The peeling strength refers to the bonding strength between a metal foil and a laminated prepreg, which is usually expressed by the force required for vertically peeling the clad copper foil with a width of ⅛ inch from the surface of the laminated prepreg.

[Glass Transition Temperature Test]

The glass transition temperature (Tg) is measured by using a Differential Scanning Calorimeter (DSC), wherein the measuring methods are IPC-TM-650.2.4.25C and 24C testing method of the Institute for Interconnecting and Packaging Electronic Circuits (IPC).

[Flame Retardance Test]

The flame retardance test is carried out according to UL94V (Vertical Burn), which comprises the burning of a laminate, which is held vertically, using a Bunsen burner to compare its self-extinguishing properties and combustion-supporting properties.

[Dielectric Constant and Dissipation Factor Measurement]

Dk and Df are measured according to ASTM D150 under an operating frequency of 1 GHz.

[Laminate Appearance Measurement]

The appearance measurement is carried out by observing the appearance of the laminate using a CCD. If foreign matter is observed, the result is recorded as "poor".

[Preparation of the Fillers]

$SrTiO_3$ Powder:

$SrCO_3$ and $TiO_2$ were mixed in equal molar amounts and milled evenly. The obtained mixture was sintered at 1250° C. (for Comparative Examples), 1350° C. (for Examples) or 1400° C. (for Comparative Examples) for 2 hours and then cooled to room temperature. The cooled product was coarsely milled and sanded to obtain a $SrTiO_3$ powder with an average particle size of less than 10 μm.

$Sr(Ba)TiO_3$ Powder:

$SrCO_3$, $TiO_2$, and $BaO_2$ were mixed in equal molar amounts and milled evenly. The obtained mixture was sintered at 1250° C. (for Comparative Examples) or 1350° C. (for Examples) for 2 hours and then cooled to room temperature. The cooled product was coarsely milled and sanded to obtain a $Sr(Ba)TiO_3$ powder with an average particle size of less than 10 μm.

$Sr(Ca)TiO_3$ Powder:

$SrCO_3$, $TiO_2$, and $CaO_2$ were mixed in equal molar amounts and milled evenly. The obtained mixture was sintered at 1250° C. (for Comparative Examples) or 1350° C. (for Examples) for 2 hours and then cooled to room temperature. The cooled product was coarsely milled and sanded to obtain a $Sr(Ca)TiO_3$ powder with an average particle size of less than 10 μm.

NPO Ceramic Powder:

It is obtained from Prosperity Dielectrics Co., Ltd. (sintering temperature: 1300° C.).

[Preparation of the Resin Composition]

EXAMPLE 1

According to the ratio shown in Table 1, epoxy resin (ChangChun Group) and SMA resin (Cray Valley) were used as the thermosetting resin component, imidazole (Schikoku) was used as a catalyst, 1,2-bis(pentabromophenyl) ethane (Albemarle, SAYTEX 8010) was used as a flame retardant, and $SrTiO_3$ powder (sintered at 1350° C.) was used as the filler. All of the above components were mixed under room temperature with a stirrer for 60 minutes, followed by adding methyl ethyl ketone and γ-butyrolactone (both Fluka Co.) thereinto. After stirring under room temperature for 120 minutes, a resin composition 1 was obtained.

EXAMPLE 2

The preparation procedures of Example 1 were repeated to prepare a resin composition 2, except that a mixture of $SrTiO_3$ powder (sintered at 1350° C.) and NPO ceramic powder was used as the filler and the amounts of epoxy resin and SMA resin were adjusted as shown in Table 1.

EXAMPLE 3

According to the ratio shown in Table 1, epoxy resin (ChangChun Group) and polyphenylene ether resin with acrylic groups (Sabic Co.) were used as the thermosetting resin component, benzoyl peroxide (Fluka Co.) and imidazole were used as the catalyst, 1,2-bis(pentabromophenyl) ethane was used as a flame retardant, and $Sr(Ca)TiO_3$ powder (sintered at 1350° C.) was used as a filler. All of the above components were mixed under room temperature with a stirrer for 60 minutes, followed by adding methyl ethyl ketone and γ-butyrolactone thereinto. After stirring the resultant mixture under room temperature for 120 minutes, a resin composition 3 was obtained.

EXAMPLE 4

The preparation procedures of Example 3 were repeated to prepare a resin composition 4, except that a mixture of epoxy resin and a polyphenylene ether resin with hydroxyl groups (Sabic Co.) was used as the thermosetting resin component, the phosphorus-containing flame retardant SPB 100 (Otsuka Chemical Co. Ltd.) was used as the flame retardant, and the amounts of Sr(Ca)TiO$_3$ powder were adjusted as shown in Table 1.

EXAMPLE 5

According to the ratio shown in Table 1, a polyphenylene ether resin with acrylic groups was used as the thermosetting resin component, benzoyl peroxide was used as a catalyst, 1,2-bis(pentabromophenyl) ethane was used as a flame retardant, and SrTiO$_3$ powder (sintered at 1350° C.) was used as a filler. All of the components were mixed under room temperature with a stirrer for 60 minutes, followed by adding methyl ethyl ketone and γ-butyrolactone thereinto. After stirring the resultant mixture under room temperature for 120 minutes, a resin composition 5 was obtained.

EXAMPLE 6

The preparation procedures of Example 5 were repeated to prepare a resin composition 6, except that a mixture of a polyphenylene ether resin with acrylic groups and a SMA resin was used as the thermosetting resin component, a mixture of SrTiO$_3$ powder (sintered at 1350° C.) and Sr(Ca)TiO$_3$ powder (sintered at 1350° C.) were used as the filler, and the amounts of the catalyst and the retardant were adjusted as shown in Table 1.

EXAMPLE 7

The preparation procedures of Example 5 were repeated to prepare a resin composition 7, except that a mixture of the polyphenylene ether resin with acrylic groups and a resin containing butadiene (Ricon 100®, Cray Valley Co.) was used as the thermosetting resin component, Sr(Ba)TiO$_3$ powder (sintered at 1350° C.) was used as the filler, and the amounts of the catalyst and the retardant were adjusted as shown in Table 1.

EXAMPLE 8

The preparation procedures of Example 7 were repeated to prepare a resin composition 8, except that SrTiO$_3$ powder (sintered at 1350° C.) was used as the filler, as shown in Table 1.

EXAMPLE 9

The preparation procedures of Example 5 were repeated to prepare a resin composition 9, except that a polyphenylene ether resin with alkenyl groups (Sabic Co.) was used as the thermosetting resin component, the NPO ceramic powder was used as the filler, and the amount of the catalyst was adjusted as shown in Table 1.

Comparative Example 1

The preparation procedures of Example 1 were repeated to prepare a comparative resin composition 1, except that epoxy resin was used as the thermosetting resin component and Sr(Ba)TiO$_3$ powder (sintered at 1350° C.) was used as the filler as shown in Table 1.

Comparative Example 2

The preparation procedures of Example 1 were repeated to prepare a comparative resin composition 2, except that a mixture of SrTiO$_3$ powder (sintered at 1350° C.) and Sr(Ba)TiO$_3$ powder (sintered at 1350° C.) was used as the filler as shown in Table 1.

Comparative Example 3

The preparation procedures of Example 1 were repeated to prepare a comparative resin composition 3, except that SrTiO$_3$ powder (sintered at 1250° C.) was used as the filler as shown in Table 1.

Comparative Example 4

The preparation procedures of Example 7 were repeated to prepare a comparative resin composition 4, except that Sr(Ba)TiO$_3$ powder (sintered at 1250° C.) was used as the filler as shown in Table 1.

Comparative Example 5

The preparation procedures of Example 4 were repeated to prepare a comparative resin composition 5, except that Sr(Ca)TiO$_3$ powder (sintered at 1250° C.) was used as the filler as shown in Table 1.

Comparative Example 6

The preparation procedures of Example 1 were repeated to prepare a comparative resin composition 6, except that SrTiO$_3$ powder (sintered at 1400° C.) was used as the filler as shown in Table 1.

TABLE 1

| | parts by weight | | Example 1 | Example 2 | Example 3 | Example 4 | Example 5 | Example 6 | Example 7 | Example 8 | Example 9 |
|---|---|---|---|---|---|---|---|---|---|---|---|
| thermosetting resin | epoxy resin | | 30 | 20 | 30 | 20 | | | | | |
| | Polyphenylene ether resin | acrylic group | | | 30 | | 60 | 50 | 50 | 50 | |
| | | alkenyl group | | | | | | | | | 60 |
| | | hydroxyl group | | | | 40 | | | | | |

TABLE 1-continued

| parts by weight | | 1 | 2 | 3 | 4 | 5 | 6 | 7 | 8 | 9 |
|---|---|---|---|---|---|---|---|---|---|---|
| | SMA resin | 30 | 40 | | | 10 | | | | |
| | resin containing butadiene | | | | | | 10 | 10 | | |
| catalyst | benzoyl peroxide | | | 0.3 | | 0.6 | 0.7 | 0.8 | 0.8 | 0.5 |
| | imidazole | 0.5 | 0.5 | 0.5 | 0.4 | | | | | |
| retardant | SAYTEX 8010 | 11 | 11 | 11 | | 10 | 11 | 12 | 12 | 10 |
| | SPB100 | | | | 18 | | | | | |
| filler | SrTiO$_3$ (sintered at 1350° C.) | 110 | 60 | | | 90 | 40 | | 220 | |
| | SrTiO$_3$ (sintered at 1250° C.) | | | | | | | | | |
| | SrTiO$_3$ (sintered at 1400° C.) | | | | | | | | | |
| | Sr(Ba)TiO$_3$ (sintered at 1350° C.) | | | | | | | 110 | | |
| | Sr(Ba)TiO$_3$ (sintered at 1250° C.) | | | | | | | | | |
| | Sr(Ca)TiO$_3$ (sintered at 1350° C.) | | | 30 | 110 | | 70 | | | |
| | Sr(Ca)TiO$_3$ (sintered at 1250° C.) | | | | | | | | | |
| | NPO ceramic powder (sintered at 1300° C.) | 5 | 0 | | | | | | | 100 |

| parts by weight | | Comparative Example 1 | Comparative Example 2 | Comparative Example 3 | Comparative Example 4 | Comparative Example 5 | Comparative Example 6 |
|---|---|---|---|---|---|---|---|
| thermosetting resin | epoxy resin | 60 | 60 | 30 | | 20 | 30 |
| | Polyphenylene ether resin acrylic group | | | | 50 | | |
| | alkenyl group | | | | | | |
| | hydroxyl group | | | | 40 | | |
| | SMA resin | | | 30 | | | 30 |
| | resin containing butadiene | | | | 10 | | |
| catalyst | benzoyl peroxide | | | | 0.8 | | |
| | imidazole | 0.5 | 0.5 | 0.5 | | 0.4 | 0.5 |
| retardant | SAYTEX 8010 | 11 | 11 | 11 | 12 | | 11 |
| | SPB100 | | | | | 18 | |
| filler | SrTiO$_3$ (sintered at 1350° C.) | | | 45 | | | |
| | SrTiO$_3$ (sintered at 1250° C.) | | | 110 | | | |
| | SrTiO$_3$ (sintered at 1400° C.) | | | | | | 110 |
| | Sr(Ba)TiO$_3$ (sintered at 1350° C.) | 90 | 45 | | | | |
| | Sr(Ba)TiO$_3$ (sintered at 1250° C.) | | | | 110 | | |
| | Sr(Ca)TiO$_3$ (sintered at 1350° C.) | | | | | | |
| | Sr(Ca)TiO$_3$ (sintered at 1250° C.) | | | | | 110 | |
| | NPO ceramic powder (sintered at 1300° C.) | | | | | | |

[Preparation of the Laminate]

The laminates were prepared using resin compositions 1 to 9 and comparative resin compositions 1 to 6, respectively. In detail, one of those resin compositions was coated on 2116 reinforced glass fiber cloths by a roller. The coated 2116 reinforced glass fiber cloths were then placed in an oven and dried at 175° C. for 2 to 15 minutes to produce prepregs in a semi-cured state. Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide laminates 1 to 9 (corresponding to resin compositions 1 to 9) and comparative laminates 1 to 6 (corresponding to comparative resin compositions 1 to 6). Herein, the hot-pressing conditions are as follows: raising the temperature to 200° C. to 220° C. with a heating rate of 1.0 to 3.0° C./min, and hot-pressing for 180 minutes under the full pressure of 15 kg/cm$^2$ (initial pressure is 8 kg/cm$^2$) at said temperature.

The solder resistance, peeling strength, flame retardance, glass transition temperature (Tg), dielectric constant (Dk), and dissipation factor (Df) of laminates 1 to 9 and comparative laminates 1 to 6 were analyzed and the results are tabulated in Table 2.

TABLE 2

| | unit | Example 1 | Example 2 | Example 3 | Example 4 | Example 5 | Example 6 | Example 7 | Example 8 | Example 9 |
|---|---|---|---|---|---|---|---|---|---|---|
| solder resistance | minute | >10 | >10 | >10 | >10 | >10 | >10 | >10 | >10 | >10 |
| peeling strength | pound/inch | >5 | >5 | >5 | >5 | >5 | >5 | >5 | >5 | >5 |
| Tg | °C. | 168 | 160 | 180 | 189 | 170 | 176 | 171 | 185 | 186 |
| flame retardance | UL Grade | 94V0 | 94V0 | 94V0 | 94V0 | 94V0 | 94V0 | 94V0 | 94V0 | 94V0 |
| DK | 1 GHz | 8.2 | 7.5 | 5.1 | 7.7 | 7.5 | 7.9 | 8.9 | 11.2 | 5.9 |
| DF | 1 GHz | 0.0055 | 0.0050 | 0.0047 | 0.0063 | 0.0033 | 0.0035 | 0.0058 | 0.0039 | 0.0029 |
| appearance | — | Good | Good | Good | Good | Good | Good | Good | Good | Good |

| | unit | Comparative Example 1 | Comparative Example 2 | Comparative Example 3 | Comparative Example 4 | Comparative Example 5 | Comparative Example 6 |
|---|---|---|---|---|---|---|---|
| solder resistance | minute | >10 | >10 | >10 | >10 | >10 | >10 |
| peeling strength | pound/inch | >5 | >5 | >5 | >5 | >5 | 4.3 |
| Tg | °C. | 173 | 172 | 169 | 171 | 190 | 167 |
| flame retardance | UL Grade | 94V0 | 94V0 | 94V0 | 94V0 | 94V0 | 94V0 |
| DK | 1 GHz | 11 | 8.9 | 8.9 | 9.8 | 8.1 | 7.8 |
| DF | 1 GHz | 0.018 | 0.011 | 0.0075 | 0.0080 | 0.0082 | 0.0055 |
| appearance | — | Good | Good | Good | Good | Good | Poor |

As shown in Table 2, laminates 1 to 9 manufactured by using the resin compositions of the present invention are provided with satisfactory physicochemical properties and heat resistance (such as flame retardance, and Tg), especially a high peeling strength, high Dk, and low Df. In particular, Comparative Examples 1 and 2 indicate that the Df value of the laminate prepared using solely epoxy resin as the thermosetting resin component is too high; and the comparison between Example 1 and Comparative Examples 3 and 6, the comparison between Example 7 and Comparative Example 4, and the comparison between Example 4 and Comparative Example 5 all indicate that laminates with a high Dk and low Df can be obtained only in the cases where the filler met the specified sintering temperature condition. Moreover, Comparative Example 6 further indicates that if the sintering temperature exceeds the specified range, the laminate will not have satisfactory Dk and Df values anymore and the peeling strength and appearance of the laminate will deteriorate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resin composition, comprising:
   a thermosetting resin component, having a dissipation factor (Df) of no more than 0.006 at 1 GHz; and
   a filler, which is a ceramic powder obtained through a sintering process at a temperature ranging from 1300° C. to less than 1400° C.,
   wherein the amount of the filler is 10 parts by weight to 600 parts by weight per 100 parts by weight of the thermosetting resin component, and
   wherein the ceramic powder is selected from the group consisting of titanium dioxide ($TiO_2$), strontium titanate ($SrTiO_3$), calcium titanate ($CaTiO_3$), barium titanate ($BaTiO_3$), magnesium titanate ($MgTiO_3$), barium strontium titanate ($Sr(Ba)TiO_3$), calcium strontium titanate ($Sr(Ca)TiO_3$), NPO ceramic power, a co-sintered material of two or more of the foregoing compounds, and combinations thereof.

2. The resin composition of claim 1, wherein the filler is a ceramic powder obtained through a sintering process at a temperature ranging from 1350° C. to less than 1400° C.

3. The resin composition of claim 1, wherein the amount of the filler is 50 parts by weight to 400 parts by weight per 100 parts by weight of the thermosetting resin component.

4. The resin composition of claim 1, wherein the filler has an average particle size ($D_{50}$) ranging from 0.1 μm to 10 μm.

5. The resin composition of claim 1, which further comprises an additive selected from the group consisting of a hardening promoter, a dispersing agent, a flexibilizer, a retardant, a release agent, and combinations thereof.

6. The resin composition of claim 5, wherein the retardant is a bromine-containing flame retardant, a phosphorus-containing flame retardant, or a combination thereof; and the hardening promoter is selected from the group consisting of benzoyl peroxide (BPO), imidazole (MI), 2-methylimidazole (2MI), 2-ethyl-4-methylimidazole (2E4MI), 2-phenylimidazole (2PI), and combinations thereof.

7. The resin composition of claim 1, wherein the thermosetting resin component comprises a thermosetting resin selected from the group consisting of a polyphenylene ether resin having one or more reactive functional groups, styrene-based copolymers and oligomers having one or more reactive functional groups, butadiene-based copolymers and oligomers having one or more reactive functional groups, and combinations thereof.

8. The resin composition of claim 7, wherein the thermosetting resin component comprises a polyphenylene ether resin having one or more reactive functional groups and a thermosetting resin selected from the group consisting of styrene-based copolymers and oligomers having one or more reactive functional groups, butadiene-based copolymers and oligomers having one or more reactive functional groups, and combinations thereof.

9. The resin composition of claim 7, wherein the thermosetting resin component further comprises an epoxy resin.

10. The resin composition of claim 7, wherein the functional group is selected form the group consisting of hydroxyl group, carboxyl group, alkenyl group, amino group, anhydride group, maleic anhydride group.

11. A prepreg, which is prepared by immersing a substrate into the resin composition of claim 1, and drying the immersed substrate.

12. A laminate, comprising a synthetic layer and a metal layer, wherein the synthetic layer is made from the prepreg of claim 11.

* * * * *